US012462942B2

(12) United States Patent
Stone et al.

(10) Patent No.: US 12,462,942 B2
(45) Date of Patent: Nov. 4, 2025

(54) RADIOACTIVE STORAGE CONTAINER (71) Applicant: TRIAD National Security, LLC., Los Alamos, NM (US)

(72) Inventors: Timothy Stone, Los Alamos, NM (US); Oka Jude, Los Alamos, NM (US)

(73) Assignee: Triad National Security, LLC, Los Alamos, NM (US)

(*) Notice: Subject to any disclaimer, the term of this patent is extended or adjusted under 35 U.S.C. 154(b) by 451 days.

(21) Appl. No.: 18/109,433

(22) Filed: Feb. 14, 2023

(65) Prior Publication Data
US 2024/0274309 A1    Aug. 15, 2024

(51) Int. Cl.
G21F 5/12       (2006.01)
B65D 51/16      (2006.01)
G21F 5/015      (2006.01)

(52) U.S. Cl.
CPC .......... G21F 5/12 (2013.01); B65D 51/1616 (2013.01); G21F 5/015 (2013.01)

(58) Field of Classification Search
CPC ........ G21F 5/12; G21F 5/015; B65D 51/1616
See application file for complete search history.

(56) References Cited

U.S. PATENT DOCUMENTS

2011/0042377 A1\* 2/2011 Fearn ............... B65F 1/1607
                                             220/254.6

\* cited by examiner

Primary Examiner — Nicole M Ippolito (57) ABSTRACT

A container includes a two-piece lid, a base, and an O-ring. The two-piece lid includes a plate and a connector including a first leg with internal threads and a second leg. The base defines a cavity with an open end and a closed end and includes a collar with external threads. The O-ring is configured to form a seal between the two-piece lid and the base. The internal threads on the first leg of the connector engage the external threads of the collar responsive to rotation of the two-piece lid relative to the base. The second leg of the connector drives the plate towards the base responsive to the internal threads on the first leg of the connector engaging the external threads of the collar. The O-ring forms the seal as the internal threads on the first leg of the connector engage the external threads of the collar.

27 Claims, 9 Drawing Sheets

RADIOACTIVE STORAGE CONTAINER

ACKNOWLEDGEMENT OF GOVERNMENT SUPPORT

This invention was made with government support under Contract No. 89233218CNA000001 awarded by the U.S. Department of Energy. The government has certain rights in the invention.

BACKGROUND

Radioactive materials provide modern society with a great variety of benefits. These materials are used in medical applications, scientific research, industrial applications, and power plants. For example, radioactive material such as Plutonium can be used in different applications including as fuel for nuclear reactors and to power satellites. Because radioactive material can affect biological material it should be handled and stored properly.

SUMMARY

Accordingly, a need has arisen for a new storage container that can be easily handled by an operator while also providing structural soundness (e.g., when dropped) to safely store radioactive material. Ease of handling a storage container may be related to ease of alignment of the lid to the base, structural grip of the lid/container, ease of securing the lid to the base, etc., to name a few.

In some embodiments, a container includes a two-piece lid, a base, and an O-ring. The two-piece lid includes a plate and a connector. The connector includes a first leg with internal threads and a second leg for securing the plate to the base. The base defines a cavity with an open end and a closed end and includes a collar with external threads. The O-ring is configured to form a seal between the two-piece lid and the base. The internal threads on the first leg of the connector engage the external threads of the collar in response to rotation of the two-piece lid relative to the base. The second leg of the connector drives the plate towards the base in response to the internal threads on the first leg of the connector engaging the external threads of the collar. The O-ring forms the seal as plate is driven towards to the base by connector as the internal threads on the first leg engage the external threads on the collar.

In some embodiments, the plate includes a protrusion. The second leg of the connector presses against the protrusion in response to the internal threads on the first leg of the connector engaging the external threads of the collar.

In some embodiments, the second leg of the connector includes a protrusion. The protrusion presses against the plate in response to the internal threads on the first leg of the connector engaging the external threads of the collar.

In some embodiments, the first leg of the connector has an elongated vertical piece that extends beyond the internal threads and the external threads. The elongated vertical piece aligns the two-piece lid with the collar of the base. It is appreciated that a bottom surface of the elongated vertical piece does not contact the collar.

In some embodiments, the plate includes a protrusion that creates a seal with the O-ring in response to the internal threads on the first leg of the connector engaging the external threads of the collar.

In some embodiments, the collar includes an angled portion that supports the O-ring.

According to some embodiments, the external threads are a three thread lead-in.

In one nonlimiting example, the external threads are buttress threads.

It is appreciated that in some embodiments, the O-ring is positioned between the plate and the collar.

According to some embodiments, the O-ring is positioned partially within a groove in the plate and further positioned to contact a vertical wall of the collar.

In some embodiments, the O-ring is positioned partially within a groove in the plate and contacts an upper surface of the collar.

In some embodiments, a thickness of the two-piece lid prevents a distal end of the plate from contacting the collar.

According to some embodiments, the container further includes a filter positioned on the plate and wherein the filter comprises an upper filter media and a lower filter media that sandwich a membrane. The upper filter media and the lower filter media are configured to allow gas to pass through and wherein the membrane prevents liquid from entering the container.

In some embodiments, the membrane comprises Polytetrafluoroethylene (PTFE).

It is appreciated that in some embodiments the two-piece lid includes a plurality of protrusions positioned on the second leg of the connector.

According to some embodiments, the plurality of protrusions includes a material that is different from the first leg of the connector, wherein the plurality of protrusions is configured to facilitate threading and unthreading the connector to and from the base.

In some embodiments, the two-piece lid includes at least one of aluminum bronze, 316 steel, or Nitronic 60 stainless steel.

According to some embodiments, the base and the two-piece lid comprise 316L steel or Nitronic 60 stainless steel.

In some embodiments, the two-piece lid includes drain holes to drain condensation and liquid away from the plate.

In some embodiments a container includes a lid, a base, and a strikeless latch. The base has an open end and a closed end. The strikeless latch presses the lid that is positioned on the open end of the base toward the base to close the container in response to the strikeless latch moving to a closed position.

In some embodiments, the strikeless latch includes a panel, a handle and a latch on the lid. The strikeless latch includes a circumferential lip on the base.

In some embodiments, the handle rotates to engage the latch with the circumferential lip in a closed position. In some embodiments, the handle rotates to disengage the latch from the circumferential lip in an open position.

In some embodiments, the circumferential lip forms a ring on the base.

According to some embodiments, the circumferential lip is positioned within a channel within the base.

In some embodiments, the container further includes a filter positioned on the lid. The filter comprises an upper filter media and a lower filter media that sandwich a membrane. The upper filter media and the lower filter media are configured to allow gas to pass through. The membrane prevents liquid from entering the container.

In some embodiments, the membrane comprises Polytetrafluoroethylene (PTFE).

In some embodiments, the base and the lid comprise 316L steel or Nitronic 60 stainless steel.

These and other features and aspects of the concepts described herein may be better understood with reference to the following drawings, description, and appended claims.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A need has arisen for a new storage container that can be easily handled by an operator while providing structural soundness to safely store radioactive material. The storage containers described below have structural features that provide many benefits for storage containers, e.g., improved lid to base alignment, improved structural grip for the lid/container, improved mechanism to secure the lid to the base, among others. The advantages of the new storage container will be described below and can be seen in FIGS. 1-9. It is appreciated that the same element number may have been referenced in different figures for convenience. The same element numbers that are referenced in different figures function substantially the same as the first time they were introduced and described.

Figure 1:
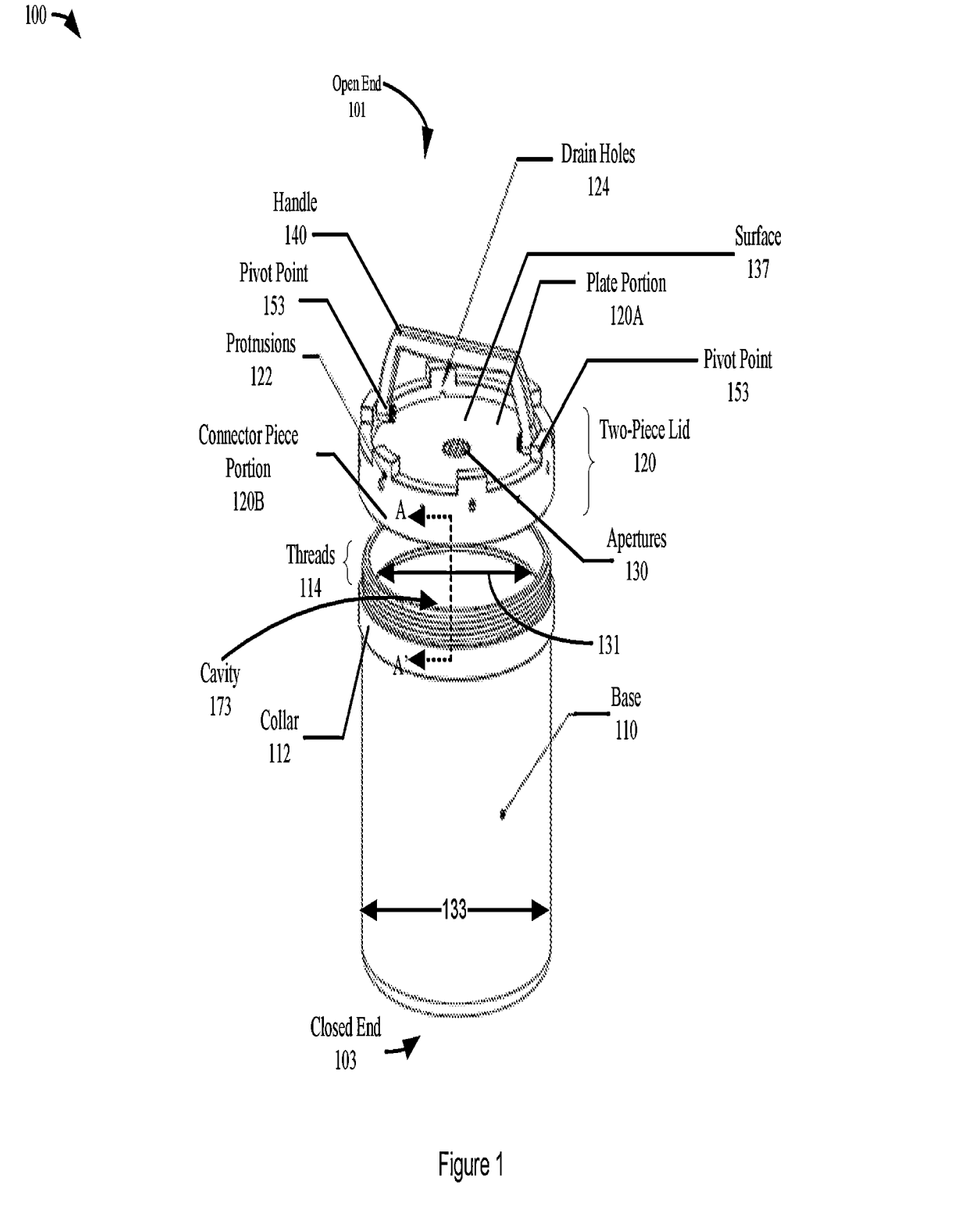
FIG. 1 depicts an example of a storage container according to one aspect of the present embodiments.

FIG. 1 illustrates an example of a storage container 100 according to one aspect of the present embodiments. The storage container 100 may include a base 110 defining a cavity 173 with a closed end 103 and an open end 101. The closed end 103 of the base 110 can rest on a surface, e.g., ground, table, etc., while radioactive material is placed inside the base 110 from the open end 101 of the base 110. It is appreciated that the base 110 may also include a collar 112 with threads 114 (e.g., buttress threads) that enable a two-piece lid 120 (that includes a plate portion 120A and a connector piece portion 120B) to be secured to the base 110 in order to close the container 100. It is appreciated that the collar 112 defines an inner diameter 131 that is less than an outermost diameter 133 of the base 110 to facilitate nesting an O-ring 220 (shown in subsequent Figures) and to accommodate a standard size O-ring.

According to some embodiments, the threads 114 are a three thread lead-in. A three thread lead-in may be used to secure the two-piece lid 120 to the base 110 with a minimal number of turns while simultaneously enabling alignment of the internal threads 113, shown in FIGS. 2-4, of the two-piece lid 120 (described later) with the threads 114 of the base 110 (e.g., collar 112). It is appreciated that handling the container 100, e.g., alignment of the threads (e.g., internal threads of the connector 120B (not shown here) to threads 114 on the base 110, etc., may be challenging as the operator handling the radioactive material and the storage container 100 is usually wearing gloves and a protective suit. As such, the three thread lead-in facilitates alignment and reduces the number of turns needed to secure the plate portion 120A of the two-piece lid 120 between the connector piece portion 120B of the two-piece lid 120 and the base 110.

It is appreciated that the two-piece lid 120 may include two pieces, e.g., the plate portion 120A that covers the opening of the base 110 and the connector piece portion 120B that secures the plate portion 120A to the base 110, as described later in FIGS. 2-4. The two-piece lid 120 may also include protrusions 122 positioned on the connector piece portion 120B enabling the operator (especially with a special suit and gloves) to grip the connector piece portion 120B of the two-piece lid 120 and to turn it in order to open/close the two-piece lid 120 with respect to the base 110. In some embodiments, the protrusions 122 may enable an operator to use a tool (e.g., bar) to open the storage container 100. It is appreciated that the protrusions 122 may be spaced apart at equal distance from one another and positioned on the periphery of the connector piece portion 120B, enabling the operator to grip the connector piece portion 120B with ease. In some embodiments, the spacing between the protrusions 122 may not be uniform. In some nonlimiting example, the connector piece portion 120B with the protrusions 122 may form a castle nut shape configured to facilitate threading/unthreading the connector piece portion 120B to/from the base 110. According to one nonlimiting example, the two-piece lid 120 may include a handle 140 for ease of transportation of the container 100. It is appreciated that in some embodiments, the handle 140 may pivot or rotate about connection or pivot points 153 such that in a vertical or upright position the container 100 can be easily grabbed and transported and when not in use rotated to a horizontal position for compact storage.

It is appreciated that in some embodiments, the two-piece lid 120 may include drain holes 124 that enable condensation or liquid to flow away from the surface 137 of the two-piece lid 120. It is appreciated that use of the drain holes 124 enables removal of liquid and/or condensation away from the apertures 130 that are formed within the plate portion 120A of the two-piece lid 120. It is appreciated that in some embodiments a filter assembly 900 (not shown in FIG. 1 but discussed in FIG. 9) may be positioned underneath the apertures 130.

It is appreciated that the apertures 130 may allow fluid and/or gas to flow through the apertures. However, the filter assembly 900 (described in FIG. 9) that includes an upper filter media 902, the membrane 906, and the lower filter media 904 resist entry of fluid/liquid into the container 100 while allowing gas to escape/vent from the container 100 to the outside environment. Accordingly, the apertures 130 may be used to remove gas/vapor from the container 100 via the upper filter 902, the membrane 906, and the lower filter media 904 that are described in greater detail in FIG. 9. The drain holes 124 enable liquid/condensation removal from the surface 137 of the two-piece lid 120 away from the apertures 130, and thereby block or resist liquid pooling on surface 137 and/or on the filter assembly 900.

It is appreciated that the use of the apertures 130 is shown for illustrative purposes and should not be construed as limiting the scope of the embodiments. For example, a container 100 may not include apertures 130 or the filter assembly 900 described in FIG. 9. It is appreciated that the connector piece portion 120B may be manufactured from a first material (e.g., aluminum bronze, Nitronic 60 stainless steel) that is different from a second material used for the plate portion 120A, the base 110, and the collar 112 (e.g., 316L steel) in order to reduce or prevent galling between the threads 114 and the threads on connector piece portion 120B. In some embodiments, the plate portion 120A and the connector piece portion 120B, the base 110, and collar 112 may all be manufactured from Nitronic 60 stainless steel to block or reduce galling. In one nonlimiting example, the container 100 (i.e., two-piece lid 120 and base 110) may be manufactured from a single material, e.g., Nitronic 60 stainless steel, 316L steel, etc.

Figure 2:
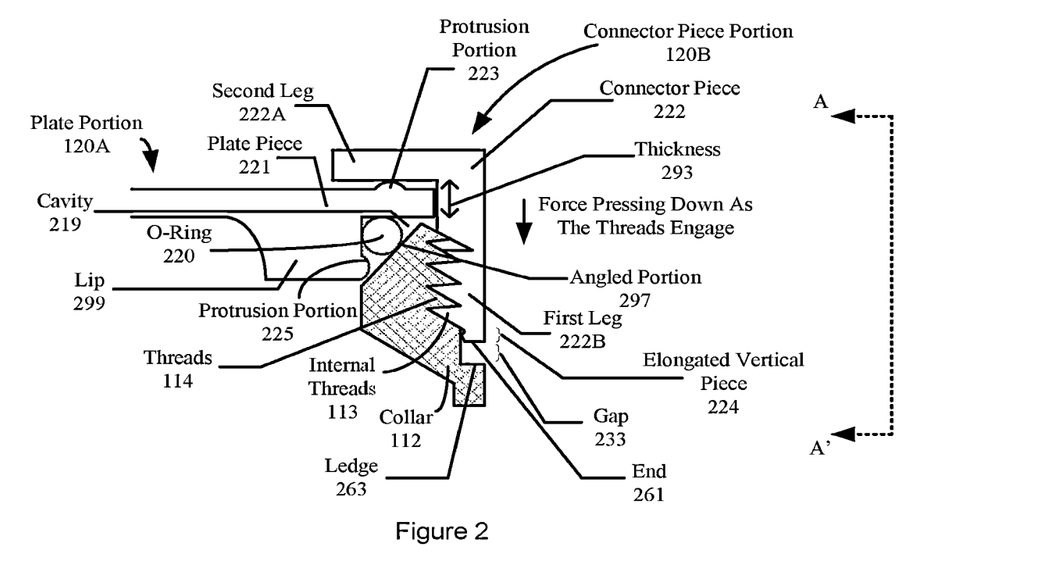
FIGS. 2-4 depict examples of a two-piece lid and a collar for a storage container according to one aspect of the present embodiments.
Figure 3:
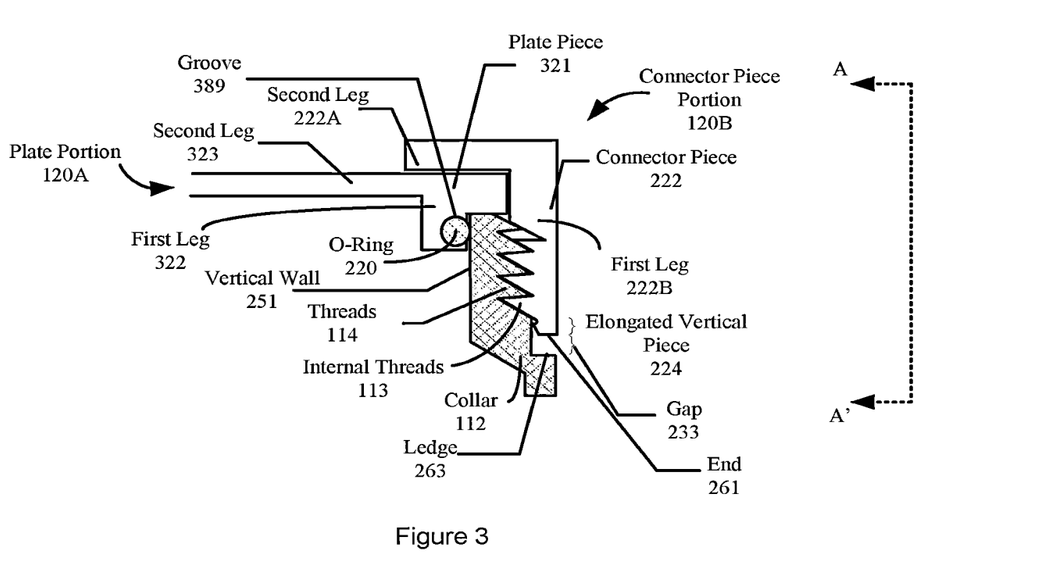
Figure 4:
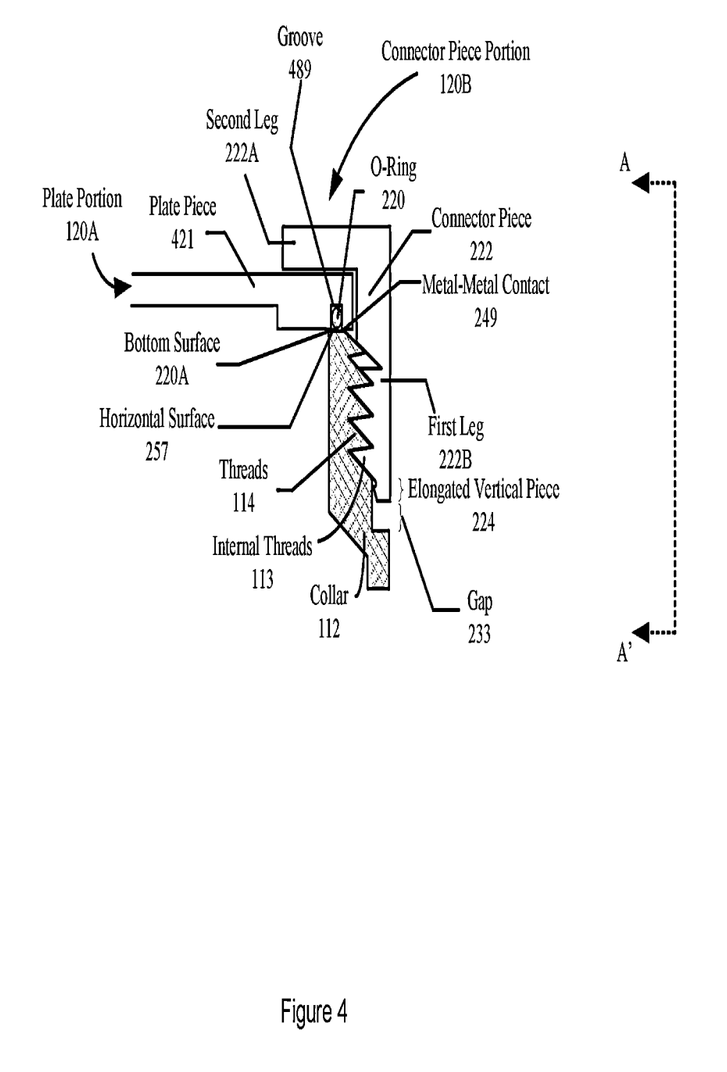

FIGS. 2-4 include examples of a two-piece lid 120 and a collar 112 for a storage container 100 according to different aspects of the present disclosure. FIG. 2 is a partial cross sectional view of a two piece lid 120 that engages the collar 112. In one nonlimiting example, the plate portion 120A of the two-piece lid 120 includes a plate piece 221 (as shown in FIGS. 2-4) and the connector piece portion 120B of the two-piece lid 120 includes a connector piece 222 (that includes a first leg 222B and a second leg 222A and as shown in FIGS. 2-4). In some embodiments, the plate portion 120A includes a lip 299 with respect to the plate piece 221. In some embodiments, the connector piece 222 of the connector piece portion 120B may be L-shaped. It is appreciated that the L-shaped connector piece 222 is for illustrative purposes and should not be construed as limiting the scope of the embodiments. For example, the connector piece 222 of the connector piece portion 120B may have a first leg 222B and a second leg 222A. The first leg 222B of the connector piece 222 of the connector piece portion 120B has internal threads 113 that engage the external threads 114 of the collar 112, e.g., buttress threads. The collar 112 engages with the first leg 222B of the connector piece 222 of the connector piece portion 120B and the plate piece 221 of the plate portion 120A of the two-piece lid 120.

It is appreciated that an O-ring 220 (e.g., seal) may be placed between the plate piece 221 of the plate portion 120A and an angled portion 297 of the collar 112 in a cavity 219 formed by the plate piece 221 and the lip 299 (e.g., circumferential lip, leg, extension) of the plate portion 120A. In some embodiments, the plate piece 221 of the plate portion 120A includes protrusion portions 223 and 225. In some embodiments the plate piece 221 of the plate portion 120A may include only the protrusion 223 or only the protrusion 225. Protrusion portion 223 increases a width or thickness of the plate piece 221 of the plate portion 120A and engages with the second leg 222A on the connector piece 222 of the connector piece portion 120B, thereby enabling the plate portion 221 of the plate portion 120A to tightly secure the O-ring 220 between the plate portion 221 of the plate portion 120A and the angled portion 297 of the collar 112, as the internal threads 113 of the first leg 222B of the connector piece 222 of the connector piece portion 120B engages with the external threads 114 of the collar 112 (i.e., as two-piece lid 120 is rotates with respect to the base 110). It is appreciated that the protrusion portion 225 blocks or reduces movement of the O-ring 220 with respect to the plate piece 221 and the lip 299 of the plate portion 120A to enable proper positioning and seal formation with the O-ring 220 between the plate portion 120A and the collar 112.

It is appreciated that the embodiment is described with respect to the protrusion portion 223 being part of the plate piece 221 of the plate portion 120A for illustrative purposes and should not be construed as limiting the scope of the embodiments. For example, in some embodiments, the second leg 222A of the connector piece 222 of the connector piece portion 120B may include a protrusion(s). In yet other embodiments, both the second leg 222A of the connector piece 222 of the connector piece portion 120B and the plate piece 221 of the plate portion 120A may include protrusions. It is appreciated that the protrusions may be aligned to contact one another when protrusions are used for both the second leg 222A of the connector piece 222 of the connector piece portion 120B and the plate piece 221 of the plate portion 120A; however, in other embodiments they may be placed such that they are not aligned. As will be explained below, protrusions may increase a length or thickness 293 that blocks an end 261 of the first leg 222B of the connector piece 222 of the connector piece portion 120B from contacting the collar 112 (e.g., a ledge 263 formed on the collar 112).

In some embodiments, the connector piece 222 of the connector piece portion 120B that includes the first leg 222B may include an elongated vertical piece 224 that extends beyond the threads 114. The elongated vertical piece 224 is used to align the two-piece lid 120 with the collar 112 with ease, especially when the individual handling the container 100 is wearing a bulky suit with gloves for protection. The elongated vertical piece 224 is used to guide the first leg 222B of the connector piece 222 of the connector piece portion 120B to align with the collar 112. A gap 233 is formed between a bottom of the elongated vertical piece 224 and a top of the collar 112 once the internal thread 113 engages the external thread 114 and secures the plate piece 221 of the plate portion 120A between the connector piece portion 120B and the collar 112 and drives the second leg 222A of the connector piece 222 of the connector piece portion 120B toward the base 110. It is appreciated that the thickness 293 of the plate piece 221 of the plate portion 120A is selected to prevent the end 261 of the connector piece 222 from contacting the ledge 263 on the collar 112 as well as preventing the first leg 222B of the connector piece 222 of the connector piece portion 120B from interfering with appropriate compression of and seal formation with the O-ring 220. In other words, the distal end of the first leg 222B of the connector piece 222 of the connector piece portion 120B does not contact the collar 112 and prevent compression of the O-ring 220.

FIG. 3 is substantially similar to that of FIG. 2. However, in this nonlimiting example, the collar 112 does not have an angled portion 297. In this nonlimiting example, the plate piece 321 of the plate portion 120A is L-shaped, similar to the plate piece 222 of the plate portion 120A of FIG. 2. The plate piece 321 that is L-shaped in this example includes a first leg 322 and a second leg 323. The first leg 322 of the L-shaped plate piece 321 of the plate portion 120A includes a groove 389 (e.g., circumferential groove) for placement and retention of the O-ring 220. In this example, the O-ring 220 contacts the wall or surface 251 of the collar 112 and is placed within the groove 389 in the first leg 322 of the plate portion 120A (e.g., in some embodiments the O-ring 220 may be surrounded by the first leg 322 of the plate portion 120A on three sides and contacts the vertical wall 251 of the collar 112 from a remaining side), creating a seal between the collar 112 and the plate 120A. Similar to FIG. 2, when the internal threads 113 of the first leg 222B of the connector piece 222 of the connector piece portion 120B engage the threads 114 of the collar 112, the second leg 222A of the connector piece 222 of the connector piece portion 120B presses down on the L-shaped plate piece 321 of the plate portion 120A causing the O-ring 220 in the first leg 322 of the plate portion 120A to create a seal with the vertical wall 251 of the collar 112 and to drive the second leg 222A of the connector piece 222 of the connector piece portion 120B toward the base 110. It is appreciated that in this nonlimiting example, the L-shaped plate piece 321 of the plate portion 120A is illustrated without a protrusion portion. However, as described above, a protrusion portion may be positioned on the second leg 323 of the plate portion 120A, or the second leg 222A of the connector piece 222 of the connector piece portion 120B or any combination thereof. As such, the mere fact that the second leg 323 of the plate portion 120A is illustrated without a protrusion portion is for illustrative purposes and should not be construed as limiting the scope of the embodiments.

FIG. 4 is substantially similar to that of FIG. 3. The plate piece 421 of the plate portion 120A is similar to the plate piece 221 of the plate portion 120A except that the plate piece 421 of the plate portion 120A includes a groove 489 (e.g., circumferential) for holding the O-ring 220. In this nonlimiting example, the O-ring 220 that is placed within a groove 489 in the plate piece 421 of the plate portion 120A comes into contact with the horizontal surface 257 (i.e., upper surface) of the collar 112 (as opposed to the vertical wall 251 in FIG. 3). Accordingly, this embodiment enables a metal-to-metal contact 249 between the plate piece 421 of the plate portion 120A of the two-piece lid 120 and the horizontal surface 257 of the collar 112. The O-ring 220 is held in place by placement within the groove 489 created within the plate piece 421 of the plate portion 120A and contacts the collar 112 from its bottom surface 220A. Similar to FIG. 3, the O-ring 220 creates a seal between plate piece 421 of the plate portion 120A and the collar 112 when the connector piece 222 of the connector piece portion 120B that includes the second leg 222A and the first leg 222B engage the collar 112 and presses down on the plate piece 421 of the plate portion 120A. Similar to FIG. 3, the plate piece 421 of the plate portion 120A and/or the second leg 222A of the connector piece 222 of the connector piece portion 120B may include one or more protrusions similar to that of FIG. 2. As such, the embodiment illustrated without the protrusion is for illustrative purposes only and should not be construed as limiting the scope of the embodiments.

Figure 5:
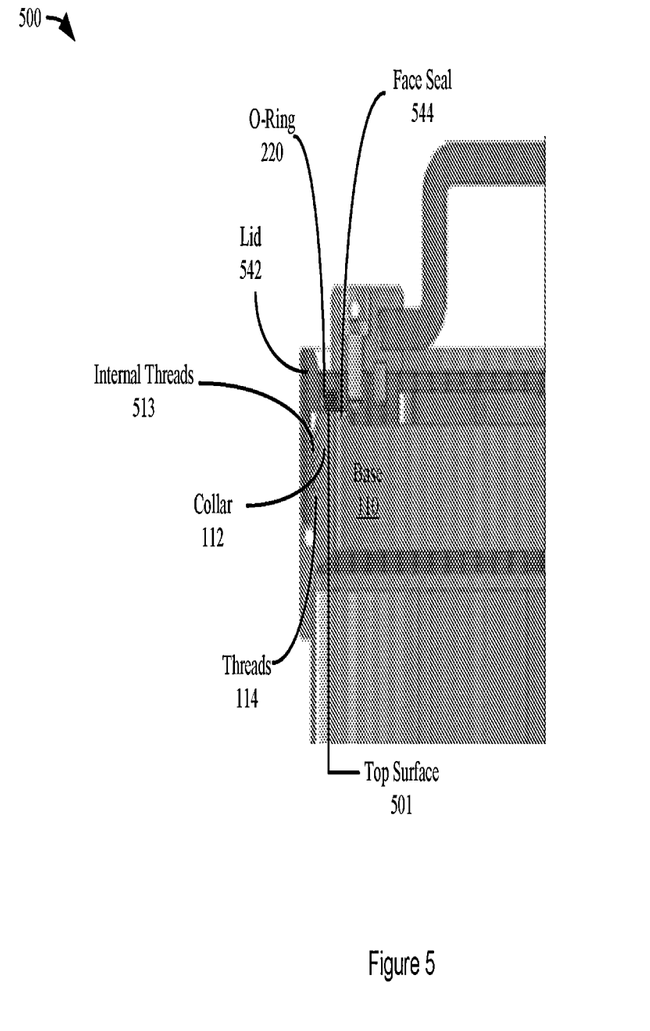
FIG. 5 depicts an example of a storage container with an integrated lid/connector according to one aspect of the present embodiments.

FIG. 5 depicts an example of a storage container 500 with an integrated lid/connector (e.g., one-piece) according to one aspect of the present embodiments. The storage container 500 is similar to the storage container 100 except that the lid 542 is a single piece lid. The lid 542 integrates the connector (i.e., internal threads 513) that engage the threads 114 of the collar 112 on the base 110. In other words, the internal threads 513 of the lid 542 engages the threads 114 of the collar 112 that are facing external to the base 110. In one nonlimiting example, the internal threads 513 and the threads 114 are buttress threads with three thread lead-in. It is appreciated that once the internal threads 513 engage the threads 114, a seal 544 is created and the lid 542 enables metal-to-metal contact between the lid 542 and the base 110. In some embodiments, the lid 542 may be formed from a material that may be different from the base 110 and its collar 112, thereby reducing or blocking galling. For example, the lid 542 may be formed from aluminum bronze whereas the base 110 and its collar 112 may be formed from 316L steel. In some embodiments, the lid 542, collar 112, and base 110 may be made from the same material (e.g., nitronic 60 stainless steel). In some embodiments, the O-ring 220 may be positioned in a recess/channel formed within the lid 542 that is positioned between the top surface 501 of the collar 112 and the lid 542.

Figure 6:
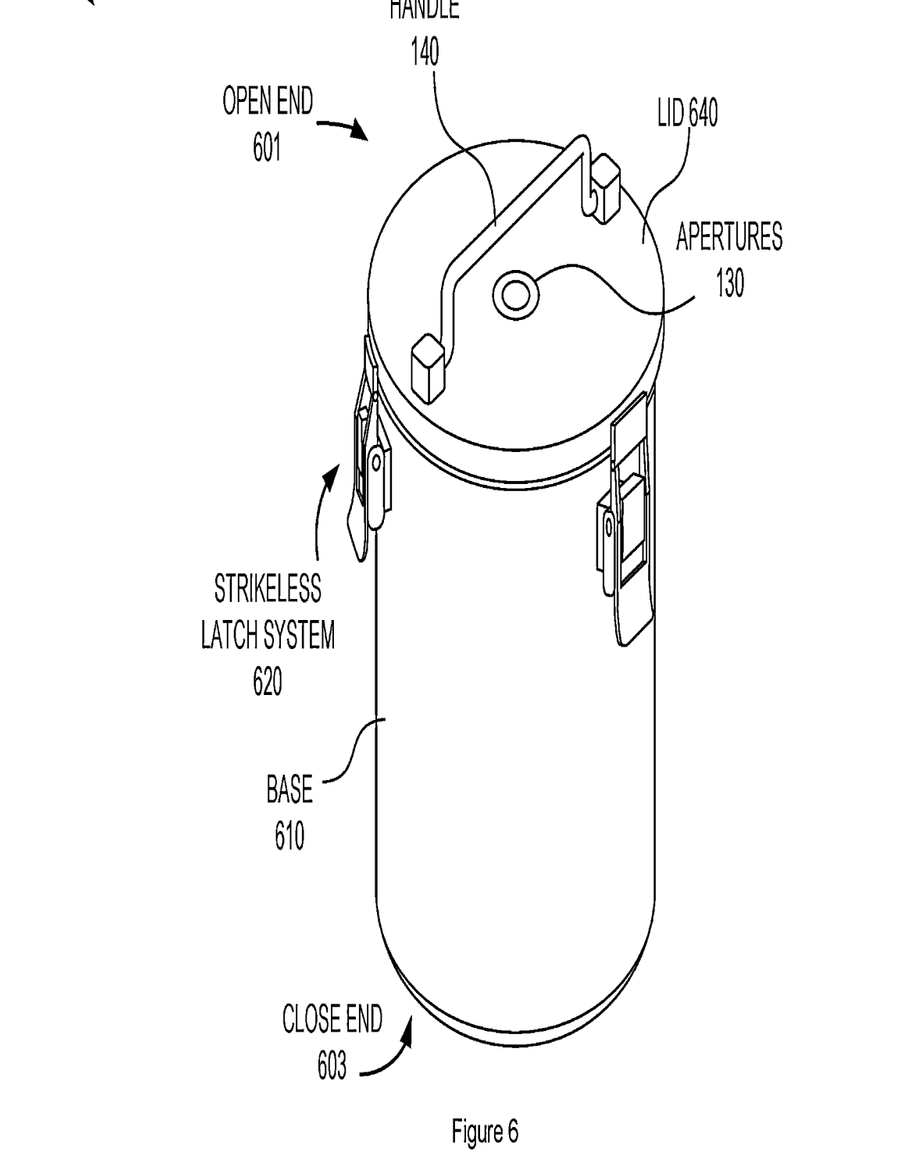
FIG. 6 depicts an example of a storage container with a strikeless latch system according to one aspect of the present embodiments.

Referring now to FIG. 6, an example of a storage container 600 with a strikeless latch system 620 according to one aspect of the present embodiments is shown. In some embodiments, the storage container 600 may include a base 610 and a lid 640 that are secured together using a strikeless latch system 620 that includes a latch that attaches to a lip, that are described in greater detail in FIGS. 8A and 8B. The lid 640 may also include a handle 140 and apertures 130 similar to that of FIG. 1 described above. The strikeless latch system 620 may be formed as part of the lid 640, the base 610, or any combination thereof. It is appreciated that the strikeless latch system 620 may not couple to a strike but instead to a lip, groove, recess, or ledge that extends circumferentially about the base 610 enabling the latch 620 to couple about the circumference of the base 610 without coupling to specific strike. For example, FIGS. 8A-8B illustrate a circumferential lip 806 that extends about the base 610 such that the drawhook (drawhook or latch 802 shown in FIG. 8A-8B) can engage with and secure the lid 640 to the base 610 without a need to align the latch 802 to a specific strike.

It is appreciated that the base 610 may have a closed end 603 and an open end 601, similar to that of FIG. 1. However, instead of using a two-piece lid with internal threads to engage the external threads of the collar, the base 610 and the lid 640 form a closed container 600 using a strikeless latch system 620 that is described in greater detail below.

Figure 7:
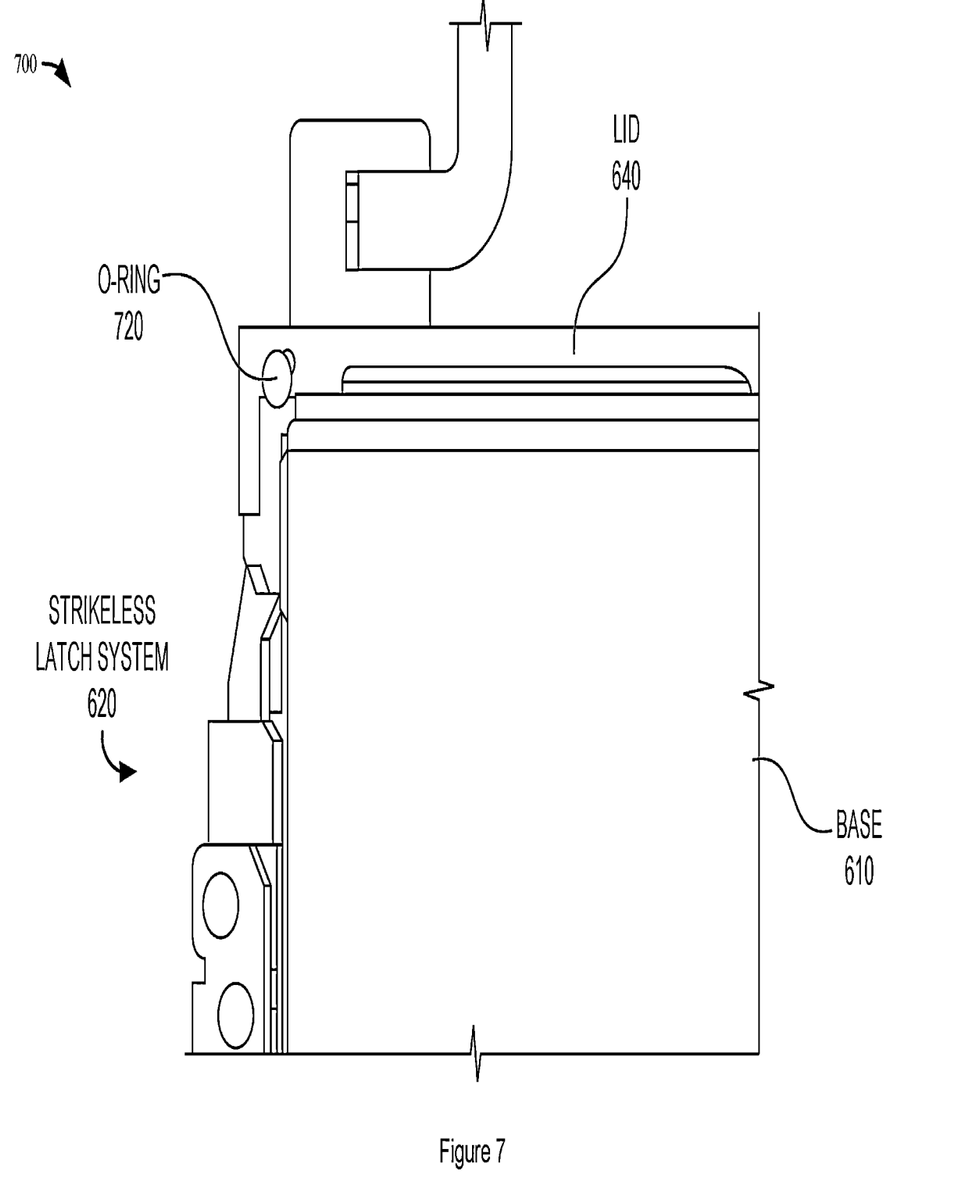
FIG. 7 depicts an example of a side view of a strikeless latch system of a storage container according to one aspect of the present embodiments.

Referring now to FIG. 7 an example of a side view of a strikeless latch of a storage container 700 according to one aspect of the present embodiments is shown. The side view illustrates the lid 640 closing the open end 601 portion of the base 610 using the strikeless latch system 620. It is appreciated that in some embodiments an O-ring 720 similar to that of FIGS. 2-4 may be positioned between the strikeless latch system 620 of the lid 640 and the base 610 to create a seal when closed.

Figure 8A:
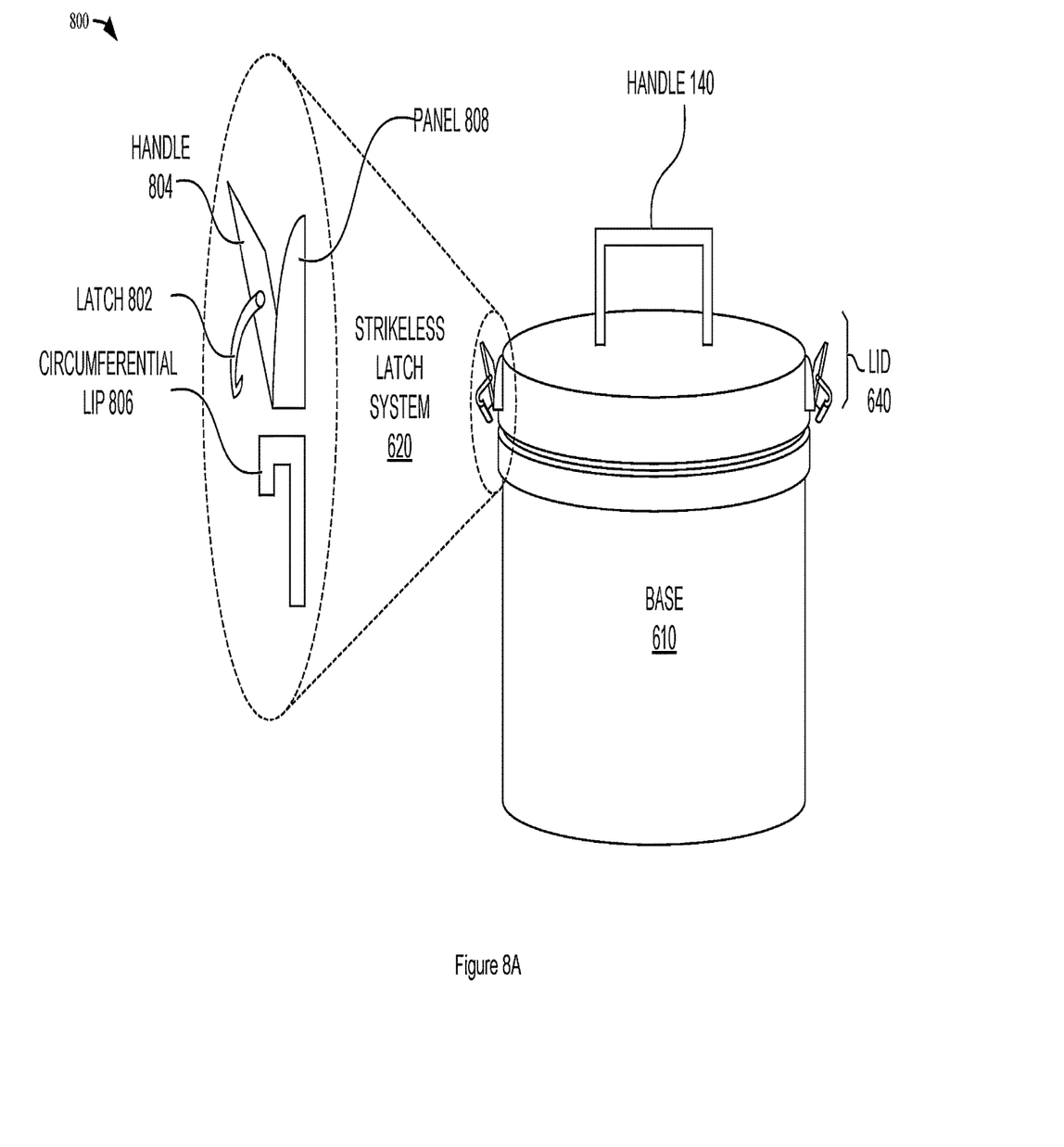
FIGS. 8A-8B depicts another example of a strikeless latch system of a storage container with the latch prior to engagement and after engagement according to one aspect of the present embodiments.
Figure 8B:
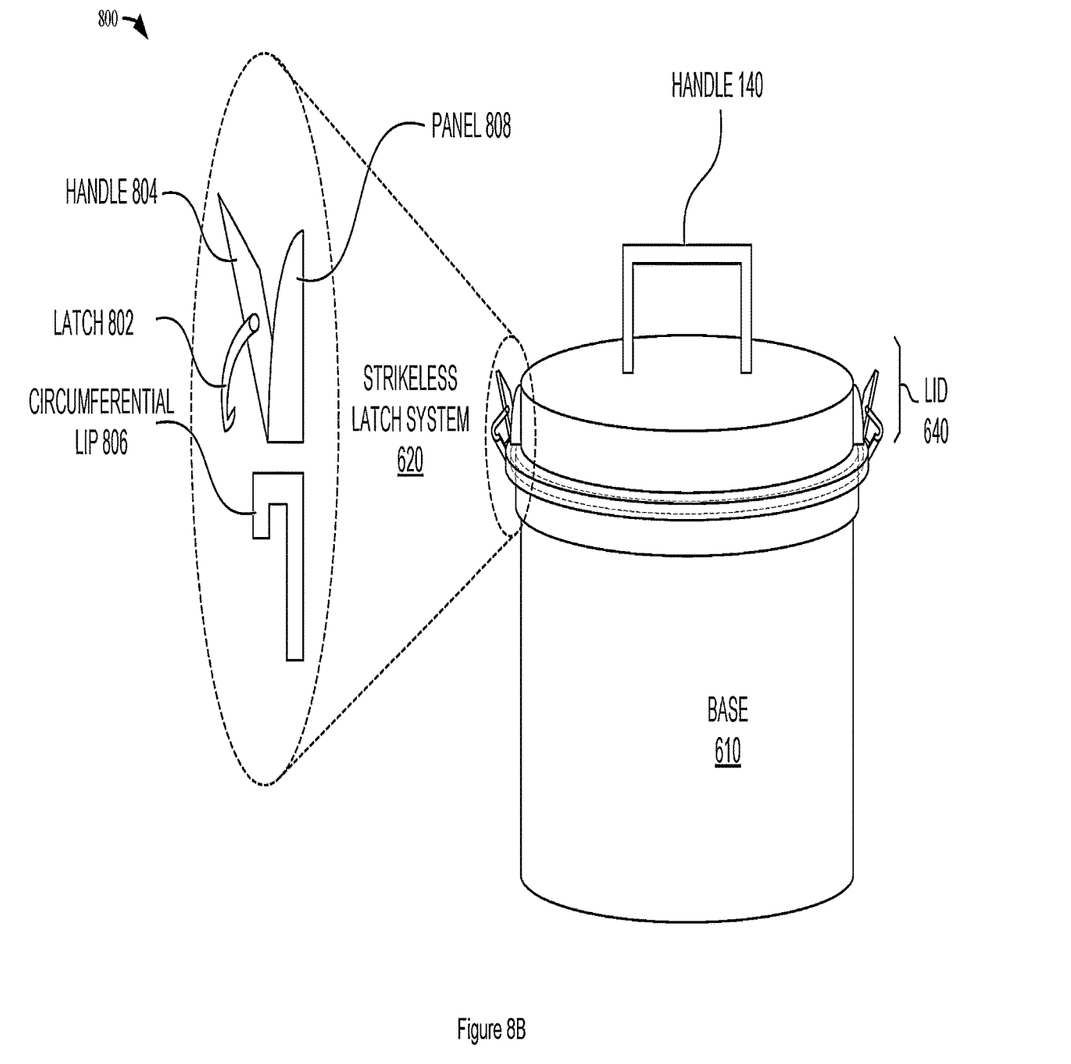

Referring now to FIG. 8A, another example of a strikeless latch system 620 of a storage container 800 prior to its engagement according to one aspect of the present embodiments is shown. In this nonlimiting example, the strikeless latch system 620 may include a panel 808, a handle 804, a latch 802, and a circumferential lip 806. It is appreciated that in some embodiments, the panel 808 may be positioned on the lid 640 and may be connected to the handle 804 and the latch 802. The handle 804 when moved, e.g., rotated about a pivot point, moves the latch 802 towards or away from the circumferential lip 806 that may be positioned (e.g., either secured or integrated as part of the base 610) on the base 610. It is appreciated that the circumferential lip 806 may form a ring on a circumference of the base 610 such that the latch 802 can engage with and secure the lid 640 to the base 610 without a need to align the circumferential lip 806 to the latch 802. In some embodiments, the circumferential lip 806 may be formed within the base 610, e.g., groove. In this illustration, the latch 802 has not engaged the circumferential lip 806 yet. However, the lid 640 is merely placed on top of the base 610 without having to align the strikeless latch system 620 in any particular position with respect to the base.

The latch 802 can engage with the circumferential lip 806, and when the handle 804 is moved to a closed position, the lid 640 secures to the base 610, as shown in FIG. 8B. Similarly, when the handle 804 is moved to an open position, the latch 802 disengages from the circumferential lip 806 in order to disengage the lid 640 from the base 610, as shown in FIG. 8A. It is appreciated that the circumferential lip 806 may form a ring around the base 610, thereby eliminating the need to align the latch 802 to the circumferential lip 806, which is an advantage when the storage container 800 is being handled by individuals with special suits and gloves. It is appreciated that the embodiment is described with respect to the circumferential lip 806 extending away (i.e., extruding out) from the base 610 for illustrative purposes but should not be construed as limiting the scope of the embodiments. For example, the circumferential lip 806 may be positioned within the body of the base 610 forming a channel around the base 610 which engages the latch 802. It is appreciated that when the latch 802 engages the circumferential lip 806 and the handle 804 is moved to a closed position, the lid 640 and the base 610 are being pulled together to securely close the storage container 800.

Figure 9:
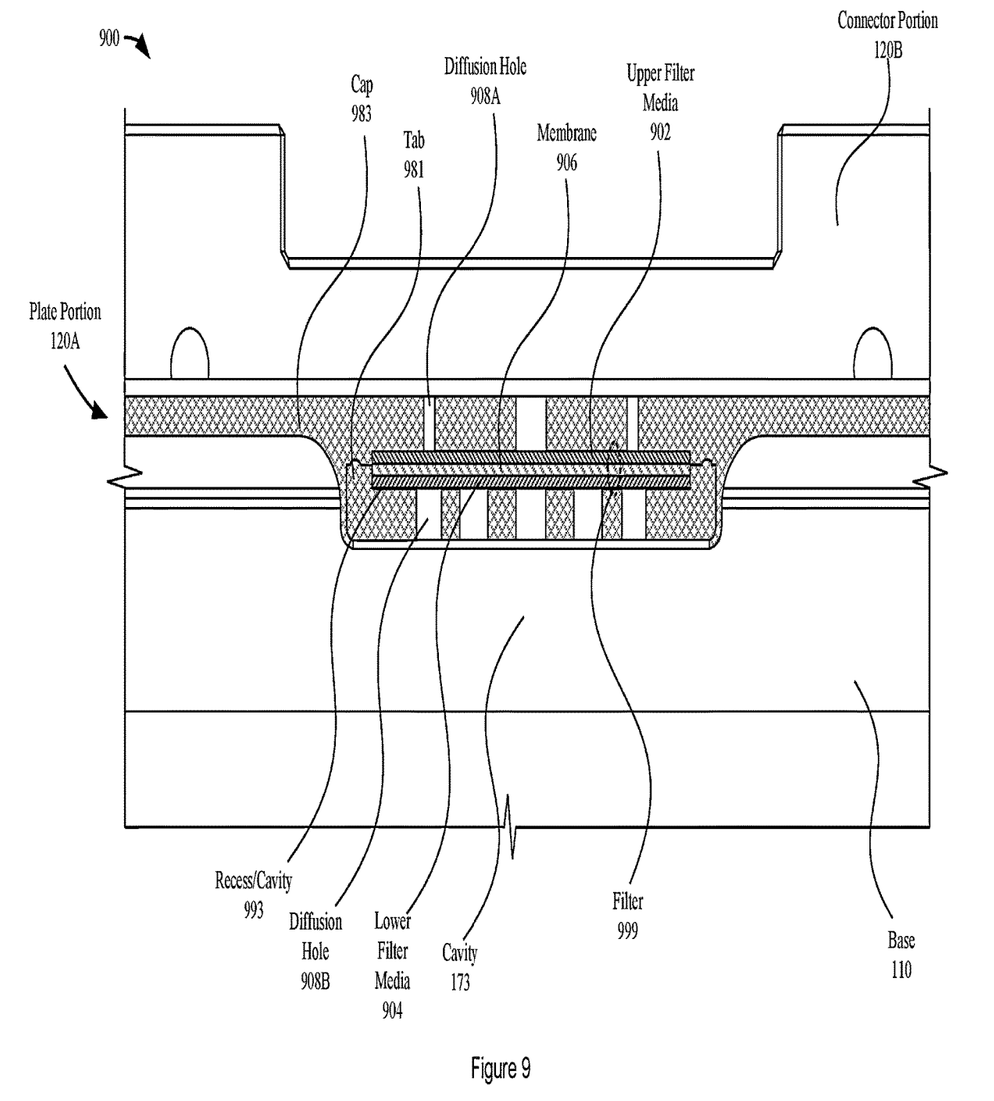
FIG. 9 depicts an example of a receptacle assembly for a filter assembly for a storage container according to one aspect of the present embodiments.

Referring now to FIG. 9, an example of a receptacle assembly 900 for holding a filter 999 for a storage container 100 according to one aspect of the present embodiments is shown. The receptacle assembly 900 defines a cavity or recess 993 that receives the filter 999. In some embodiments, the plate portion 120A of the two-piece lid 120 includes a tab 981 and a cap 983. It is appreciated that the tab 981 and the cap 983 are shown as two components for illustration purposes only but should not be construed as limited thereto. For example, the tab 981 and the cap 983 may be formed from a single piece. The tab 981 and the cap 983 form the cavity 993 within the plate portion 120A of the two-piece lid 120. The tab 981 and the cap 983 of the plate portion 120A may further include diffusion hole 908A on one surface (e.g., upper surface) of the cavity 993 that is opposite to the diffusion hole 908B on a surface (e.g., lower surface) of the cavity 993 that is opposite to that of the surface of diffusion hole 908A. The filter 999 is placed within the cavity 993. The filter 999 may include an upper filter media 902, a membrane 906, and a lower filter media 904, that are described in greater detail below. The apertures 130 on the surface 137 of the plate portion 120A exposes the cavity 993 to the external environment of the storage container 100. It is appreciated that the filter media 902 and 904 may include one or more layers and may comprise a carbon-carbon or stainless steel. The filter media 902 and 904 may be porous, e.g., aluminosilicate, and may be coated, e.g., with copper oxide coating, copper oxide nanowire coating, fluorine coating, fluoride coating, or any combination thereof. In some embodiments, the filter media 902 and 904 may include copper, copper oxide, copper nanowires, aluminosilicates, etc., coated with polyimide. The membrane 906 may include Polytetrafluoroethylene (PTFE) and is configured to prevent condensation and liquid from entering the storage container 100. It is appreciated that the diffusion holes 908A and 908B enable gas, e.g., air, to pass through between the interior of the storage container 100, e.g., cavity 173 of the base 110, and the external environment. It is appreciated that the membrane 906 may be a single layer or a multi-layer membrane.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A container comprising:
   a two-piece lid including a plate and a connector, wherein the connector includes a first leg and a second leg and wherein the first leg of the connector includes internal threads;
   a base defining a cavity with an open end and a closed end, wherein the base includes a collar with external threads; and
   an O-ring configured to form a seal between the two-piece lid and the base,
   wherein the internal threads on the first leg of the connector are configured to engage the external threads of the collar in response to rotation of the two-piece lid relative to the base, wherein the second leg of the connector is configured to drive the plate towards the base in response to the internal threads on the first leg of the connector engaging the external threads of the collar, and wherein the O-ring is configured to form the seal as the internal threads on the first leg of the connector engage the external threads of the collar.

2. The container of claim 1, wherein the plate includes a first protrusion portion, wherein the second leg of the connector presses against the protrusion when the internal threads on the first leg of the connector engage the external threads of the collar.

3. The container of claim 1, wherein the second leg of the connector includes a protrusion portion, wherein the protrusion presses against the plate in response to the internal threads on the first leg of the connector engage the external threads of the collar.

4. The container of claim 1, wherein the first leg of the connector has an elongated vertical piece that extends beyond the internal threads and the external threads, wherein the elongated vertical piece aligns the two-piece lid with the collar of the base, and wherein a bottom surface of the elongated vertical piece does not contact the collar.

5. The container of claim 1, wherein the plate includes a protrusion that creates a seal with the O-ring in response to the internal threads on the first leg of the connector engage the external threads of the collar.

6. The container of claim 1, wherein the collar includes an angled portion where the O-ring rests upon.

7. The container of claim 1, wherein the external threads are a three thread lead-in.

8. The container of claim 1, wherein the external threads are buttress threads.

9. The container of claim 1, wherein the O-ring is positioned between the plate and the collar.

10. The container of claim 1, wherein the O-ring is positioned partially within a groove in the plate and further positioned to contact a vertical wall of the collar.

11. The container of claim 1, wherein the O-ring is positioned partially within a groove in the plate and contacting an upper surface of the collar.

12. The container of claim 1, wherein a thickness of the two-piece lid prevents a distal end of the plate to contact the collar.

13. The container of claim 1 further comprising a filter positioned on the plate and wherein the filter comprises an upper filter media and a lower filter media that sandwiched a membrane, wherein the upper filter media and the lower filter media are configured to allow gas to pass through and wherein the membrane prevents liquid from entering the container.

14. The container of claim 13, wherein the membrane comprises Polytetrafluoroethylene (PTFE).

15. The container of claim 1, wherein the two-piece lid includes a plurality of protrusions positioned on the second leg of the connector.

16. The container of claim 15, wherein the plurality of protrusions includes a material that is different from the first leg of the connector, wherein the plurality of protrusions is configured to facilitate threading and unthreading the connector to and from the base.

17. The container of claim 1, wherein the two-piece lid includes at least one of aluminum bronze, 316L steel, or Nitronic 60 stainless steel.

18. The container of claim 1, wherein the base and the two-piece lid comprise 316L steel or Nitronic 60 stainless steel.

19. The container of claim 1, wherein the two-piece lid includes drain holes to drain condensation and liquid away from the plate.

20. A container comprising:
a lid;
a base with an open end and a closed end; and
a strikeless latch that presses the lid that is positioned on the open end of the base toward the base to close the container in response to the strikeless latch moving to a closed position.

21. The container of claim 20, wherein the strikeless latch includes a panel, a handle and a latch on the lid, and wherein the strikeless latch includes a circumferential lip on the base.

22. The container of claim 21 wherein the handle rotates to engage the latch with the circumferential lip in closed position, and wherein the handle rotates to disengage the latch from the circumferential lip in an open position.

23. The container of Claim 21, wherein the circumferential lip forms a ring on the base.

24. The container of claim 23, wherein the circumferential lip is positioned within a channel within the base.

25. The container of claim 20 further comprising a filter positioned on the lid, wherein the filter comprises an upper filter media and a lower filter media that sandwich a membrane, wherein the upper filter media and the lower filter media are configured to allow gas to pass through and wherein the membrane prevents liquid from entering the container.

26. The container of claim 25, wherein the membrane comprises Polytetrafluoroethylene (PTFE).

27. The container of claim 20, wherein the base and the lid comprise 316L steel or Nitronic 60 stainless steel.

* * * * *